United States Patent
Kurai et al.

(10) Patent No.: US 11,390,043 B2
(45) Date of Patent: Jul. 19, 2022

(54) FIBER-REINFORCED RESIN COMPONENT AND METHOD FOR PRODUCING FIBER-REINFORCED RESIN COMPONENT

(71) Applicant: Nissan Motor Co., Ltd., Yokohama (JP)

(72) Inventors: Shohei Kurai, Kanagawa (JP); Hiroshi Ookubo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/500,132

(22) PCT Filed: Apr. 21, 2017

(86) PCT No.: PCT/JP2017/016000
§ 371 (c)(1),
(2) Date: Oct. 2, 2019

(87) PCT Pub. No.: WO2018/193611
PCT Pub. Date: Oct. 25, 2018

(65) Prior Publication Data
US 2020/0376778 A1  Dec. 3, 2020

(51) Int. Cl.
*B29C 70/08* (2006.01)
*B29C 65/48* (2006.01)
*B29L 31/30* (2006.01)

(52) U.S. Cl.
CPC .............. *B29C 70/08* (2013.01); *B29C 65/48* (2013.01); *B29L 2031/30* (2013.01)

(58) Field of Classification Search
CPC ................................ B29C 70/08; B29C 65/48
USPC .......................................................... 428/102
See application file for complete search history.

(56) References Cited

U.S. PATENT DOCUMENTS

| | | | | |
|---|---|---|---|---|
| 4,378,394 A | * | 3/1983 | Miura | B29C 44/1271 428/113 |
| 4,378,395 A | * | 3/1983 | Asoshina | B32B 27/08 428/158 |
| 4,451,518 A | * | 5/1984 | Miura | B29C 44/1271 296/146.6 |
| 2015/0129113 A1 | * | 5/2015 | Griess | B64C 1/061 156/92 |
| 2016/0053147 A1 | * | 2/2016 | Kelch | C04B 26/16 156/331.4 |

(Continued)

FOREIGN PATENT DOCUMENTS

| | | |
|---|---|---|
| CN | 1758995 A | 4/2006 |
| CN | 101247940 A | 8/2008 |

(Continued)

*Primary Examiner* — Tahseen Khan
(74) *Attorney, Agent, or Firm* — Global IP Counselors, LLP (57) ABSTRACT

A fiber-reinforced resin component comprises a first part having a plurality of first fiber layers impregnated in a matrix resin and a second part having a plurality of second fiber layers impregnated in the matrix resin. The second part is bonded to the first part via an adhesive layer. The fiber-reinforced resin component further comprises a plurality of connecting fibers that connect the first part and the second part. One end portion of the connecting fibers is sandwiched between the first fiber layers, and the other end portion of the connecting fibers is sandwiched between the second fiber layers.

5 Claims, 5 Drawing Sheets

(56) References Cited

U.S. PATENT DOCUMENTS

| | | | |
|---|---|---|---|
| 2017/0028690 A1* | 2/2017 | Yoshida | B32B 9/00 |
| 2017/0136717 A1* | 5/2017 | Yoshida | B29C 44/1276 |
| 2018/0126605 A1* | 5/2018 | Suzuki | B29C 45/14 |
| 2018/0141416 A1* | 5/2018 | Nagaishi | B60J 5/0415 |

FOREIGN PATENT DOCUMENTS

| | | | | |
|---|---|---|---|---|
| CN | 106397802 A | 2/2017 | | |
| EP | 0 155 820 A2 | 9/1985 | | |
| EP | 1 085 152 A2 | 3/2001 | | |
| EP | EP-1085152 A2 * | 3/2001 | | B64C 27/615 |
| JP | 5-104639 A | 4/1993 | | |
| JP | 5-154920 A | 6/1993 | | |
| JP | 7-256769 A | 10/1995 | | |
| JP | 2007-292106 A | 11/2007 | | |
| JP | 2014-181431 A | 9/2014 | | |
| JP | 2014-224241 A | 12/2014 | | |
| JP | 2015-507114 A | 3/2015 | | |
| JP | 2018-140562 A | 9/2018 | | |
| WO | 2004/024424 A1 | 3/2004 | | |
| WO | 2016/203576 A1 | 12/2016 | | |
| WO | WO-2016189700 A1 * | 12/2016 | | B60J 5/0427 |
| WO | WO-2016203576 A1 * | 12/2016 | | B29C 70/745 |

\* cited by examiner

FIBER-REINFORCED RESIN COMPONENT AND METHOD FOR PRODUCING FIBER-REINFORCED RESIN COMPONENT

CROSS-REFERENCE TO RELATED APPLICATIONS

This application is a U.S. national stage application of International Application No. PCT/JP2017/016000, filed on Apr. 21, 2017.

BACKGROUND

Technical Field

The present invention relates to a connection structure for a fiber-reinforced resin component and a method for producing a fiber-reinforced resin component.

Background Information

A structure for attaching a first part made of fiber-reinforced resin to a second part is known in the prior art (for example, refer to Japanese Laid-Open Patent Application No. 2007-292106—Patent Document 1).

Japanese Laid-Open Patent Application No. 2007-292106 (Patent Document 1) discloses a joint structure of a carbon fiber-reinforced resin material in which a carbon fiber-reinforced resin material and a member to be joined are joined by a joining means. In the carbon fiber-reinforced resin material of this joint structure, the amount of linear expansion in the stacking direction due to a change in temperature is reduced by stacking a first stacking portion and a second stacking portion with a carbon fiber surface direction that is orthogonal to the carbon fiber surface direction of the first stacking portion. In addition, according to the joint structure of a fiber-reinforced resin disclosed in Patent Document 1, the member to be joined is fastened to the carbon fiber-reinforced resin material with a nut and bolt.

SUMMARY

In the structure described above, since the first part and the second part are fastened with a nut and bolt, it is unlikely that the connection between the first part and the second part (fastening with the nut and bolt) will be released due to the input of a relatively large load on the first part or the second part. Fastening with a nut and bolt reduces workability and could result in increased costs, so that a change from fastening with a nut and bolt to adhesion with an adhesive is considered. However, merely bonding the first part and the second part with an adhesive gives rise to the concern that the connection between the first part and the second part (adhesion by means of the adhesive) will let go with the input of a relatively large load on the first part or the second part, causing the first part and the second part to separate.

Therefore, an object of the present invention is to prevent the first part and the second part from separating, even if the connection between the first part and the second part (adhesion by means of the adhesive) is released due to an input of a relatively large load to the first part or the second part.

A first aspect of the present invention is a connection structure of a fiber-reinforced resin component, comprising a first part made of fiber-reinforced resin, a second part made of fiber-reinforced resin that is bonded to the first part, and connecting fibers that connect the first part and the second part. One end portion of the connecting fibers is sandwiched between first fiber layers of the first part, and the other end portion of the connecting fibers is sandwiched between second fiber layers of the second part.

A second aspect of the present invention is a method for producing a fiber-reinforced resin component. This production method comprises a step for exposing an intermediate portion between one end portion and the other end portion of connecting fibers from first fiber layers and second fiber layers, by sandwiching one end portion of the connecting fibers between the first fiber layers and sandwiching the other end portion of the connecting fibers between the second fiber layers. In addition, the above-mentioned production method further comprises a step for impregnating the first fiber layers and the second fiber layers with matrix resin, without impregnating the intermediate portion of the connecting fibers with the matrix resin.

According to the present invention, it is possible to prevent the first part and the second part from separating even if the connection between the first part and the second part (adhesion by means of the adhesive) is released due to the input of a relatively large load on the first part or the second part.

DETAILED DESCRIPTION OF THE EMBODIMENTS

An embodiment of the present invention will be described in detail below with reference to the drawings.

A connection structure of a fiber-reinforced resin component 1 according to an embodiment of the present invention will be described with reference to FIGS. 1 to 3.

The fiber-reinforced resin component 1 can be applied, for example, to vehicle component members, such as a hood (bonnet), a door panel, a bumper, a trunk lid, a rear gate, a fender panel, a side body panel, and a roof panel. In addition, the fiber-reinforced resin component 1 is not limited to vehicle component members and can be applied to various component members.

Figure 1:
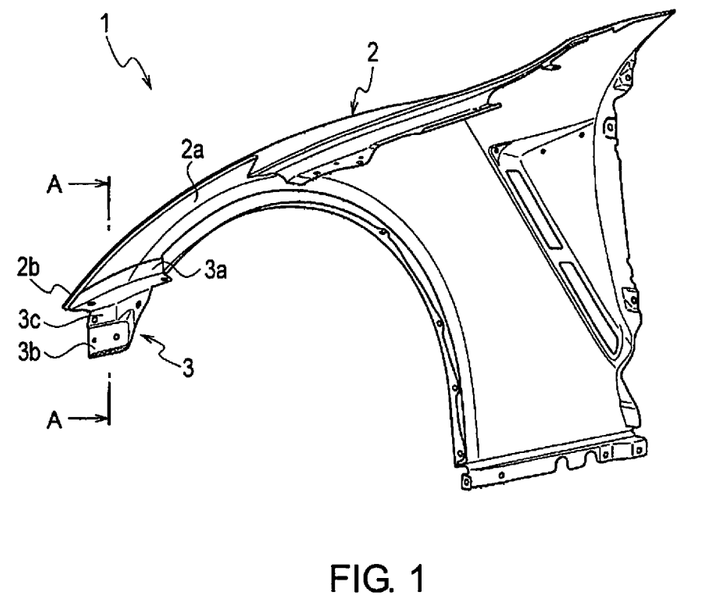
FIG. 1 is a side view illustrating a connection structure of a fiber-reinforced resin component according to an embodiment of the present invention.
Figure 2:
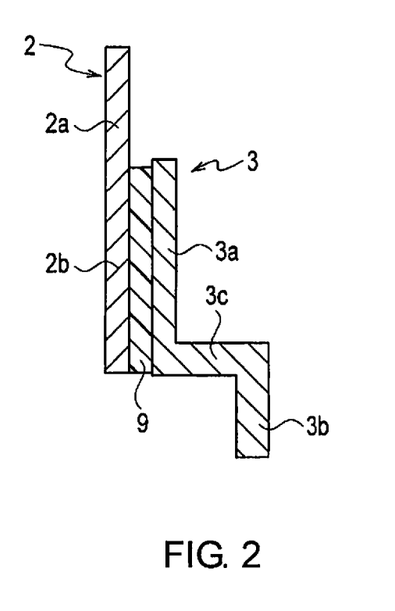
FIG. 2 is a schematic cross-sectional view illustrating a cross section taken along line A-A in FIG. 1.
Figure 3:
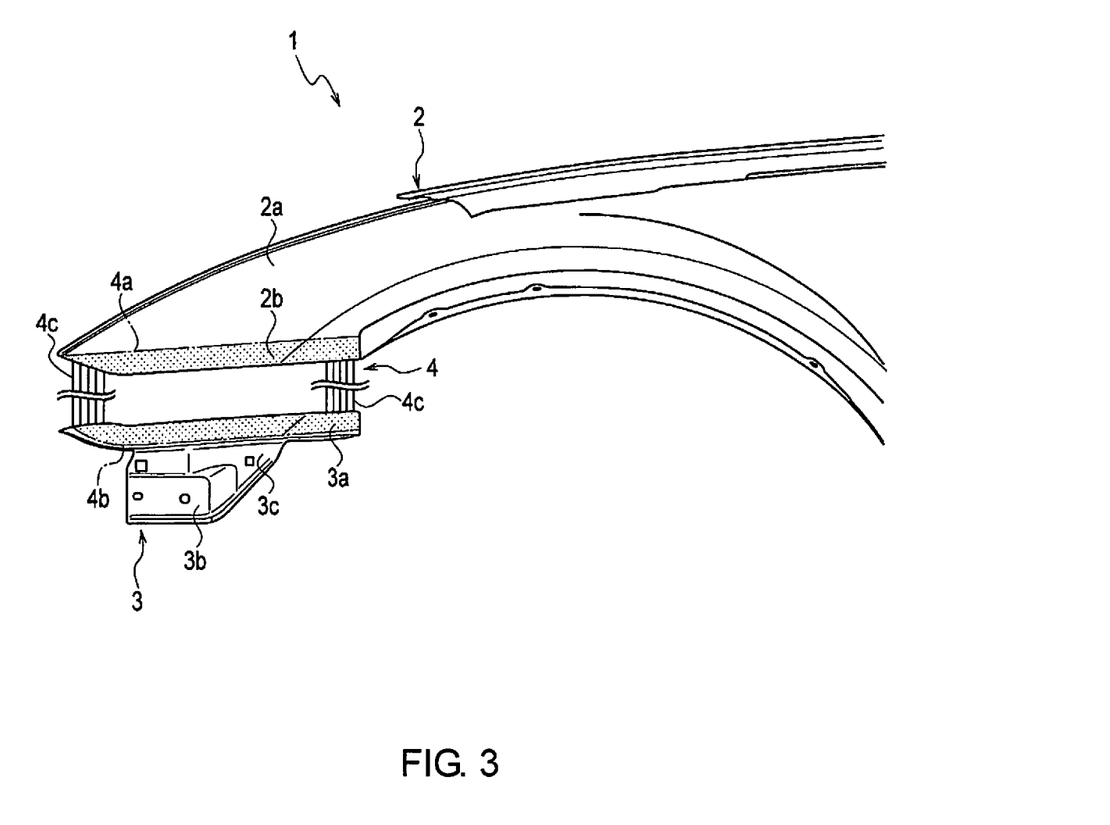
FIG. 3 is a partially enlarged side view illustrating a pre-bonding state of the connection structure of a fiber-reinforced resin component according to the embodiment of the present invention.

As illustrated in FIGS. 1 to 3, the fiber-reinforced resin component 1 is mainly composed of a first part 2, a second part 3, and connecting fibers 4.

Figure 4A:
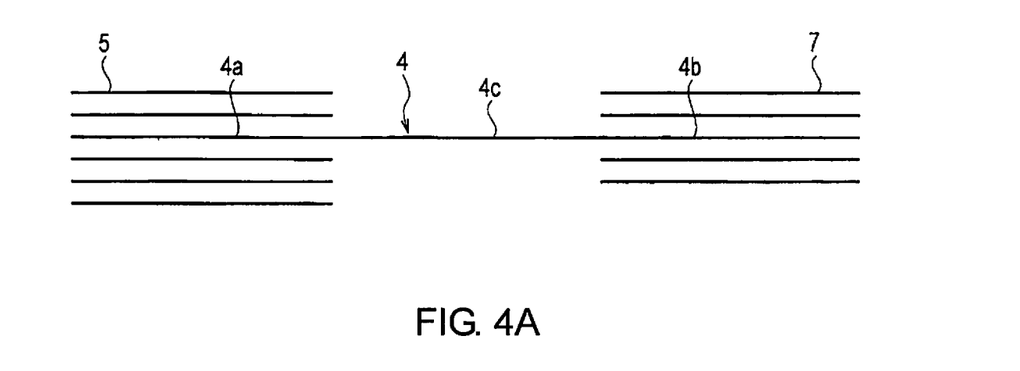
FIG. 4A is an explanatory view of a method for producing a fiber-reinforced resin component according to the embodiment of the present invention.
Figure 4B:
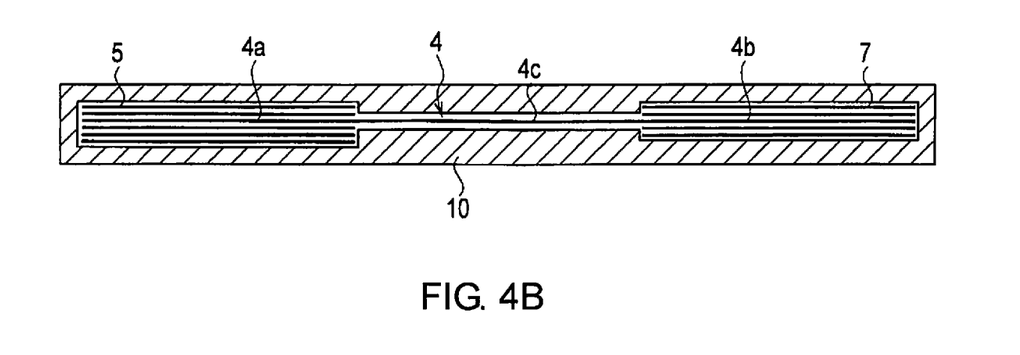
FIG. 4B is an explanatory view of the method for producing a fiber-reinforced resin component according to the embodiment of the present invention.
Figure 4C:
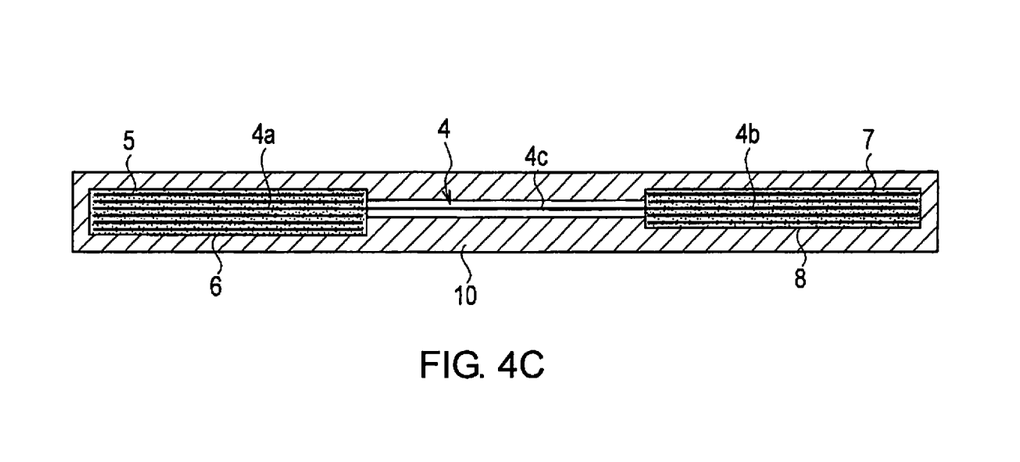
FIG. 4C is an explanatory view of the method for producing a fiber-reinforced resin component according to the embodiment of the present invention.

The first part 2 is a component made of fiber-reinforced resin configured to comprise a plurality of first fiber layers 5, and matrix resin (the first resin) 6 impregnated in the first fiber layers 5 (refer to FIG. 4C). The first part 2 according to the present embodiment is an outer panel (the fender panel) of a vehicle, which is not shown. The first part 2 is configured to include a component main body (the panel main body) 2a and a first part-side adhesive portion 2b to which the second part 3 is bonded and attached.

The fibers constituting the first fiber layers 5 are not particularly limited and may be such fibers as carbon fibers, aramid fibers, and glass fibers. In addition, for example, NCF (Non Crimp Fabric), woven fabric (woven fiber cloth), or nonwoven fabric (nonwoven fiber cloth) may be used as the first resin layer 5. Moreover, the matrix resin 6 is not particularly limited and may be such thermosetting resins as epoxy resin, phenol resin, and polyamide resin. The matrix resin 6 is not limited to thermosetting resin, and various thermoplastic resins may be used as well.

The second part 3 is a component made of fiber-reinforced resin configured to comprise a plurality of second fiber layers 7, and matrix resin (the second resin) 8 impregnated in the second fiber layers 7 (refer to FIG. 4C). The second part 3 is bonded to the first part 2 via an adhesive layer 9 (refer to FIG. 2). That is, in the present embodiment, the connection between the first part 2 and the second part 3 is effected not by means of a nut and bolt but by adhesion with an adhesive. The second part 3 according to the present embodiment is a bracket for attaching the outer panel (the first part 2) of a vehicle to the vehicle body of the vehicle, which is not shown. The second part 3 is configured to include a second part-side adhesive portion 3a that is bonded and attached to the first part 2, a vehicle body attaching portion 3b that is attached to the vehicle body of the vehicle, and a connecting portion 3c that is disposed between the second part-side adhesive portion 3a and the vehicle body attaching portion 3b.

The fibers constituting the second fiber layers 7 are not particularly limited and may be such fibers as carbon fibers, aramid fibers, and glass fibers. In addition, for example, NCF (Non Crimp Fabric), woven fabric (woven fiber cloth), nonwoven fabric (nonwoven fiber cloth) may be used as the second resin layer 7. Moreover, the matrix resin 8 is not particularly limited and may be such thermosetting resins as epoxy resin, phenol resin, and polyamide resin. The matrix resin 8 is not limited to thermosetting resin, and various thermoplastic resins may be used as well.

The adhesive constituting the adhesive layer 9 can be any adhesive with which sufficient bonding strength can be obtained, examples of which include epoxy resin based adhesives and urethane resin based adhesives. In addition, this adhesive can be a thermosetting adhesive or a thermoplastic adhesive.

The connecting fibers 4 connect the first part 2 and the second part 3. More specifically, one end portion 4a of the connecting fibers 4 (dot hatched location in FIG. 3) is sandwiched between the first fiber layers 5 of the first part 2, and the other end portion 4b of the connecting fibers 4 (dot hatched location in FIG. 3) is sandwiched between the second fiber layers 7 of the second part 3. Then, an intermediate portion 4c between the one end portion 4a and the other end portion 4b of the connecting fibers 4 is exposed from the first fiber layers 5 of the first part 2 and the second fiber layers 7 of the second part 3, and the intermediate portion 4c of the connecting fibers 4 is not impregnated with the matrix resins 6, 8.

In the present embodiment, the one end portion (first part connecting portion) 4a of the connecting fibers 4 is disposed in an intermediate layer of the first fiber layers 5 (middle layer in the thickness direction), and the other end portion (second part connecting portion) 4b of the connecting fibers 4 is disposed in an intermediate layer of the second fiber layers 7 (middle layer in the thickness direction) (refer to FIG. 4A). No limitation is imposed thereby; the first part connecting portion 4a of the connecting fibers 4 may be disposed in an outer layer outside of the intermediate layer of the first fiber layers 5, and the second part connecting portion 4b of the connecting fibers 4 may be disposed in an outer layer outside of the intermediate layer of the second fiber layers 7.

In the present embodiment, the first part connecting portion 4a of the connecting fibers 4 is not disposed in the entire first part 2 but is disposed only in part of the first part 2 (first part-side adhesive portion 2b) (refer to FIG. 3). In addition, the second part connecting portion 4b of the connecting fibers 4 is not disposed in the entire second part 3 but is disposed only in part of the second part 3 (second part-side adhesive portion 3a) (refer to FIG. 3). Moreover, the intermediate portion 4c of the connecting fibers 4 is disposed, not in the entire width direction regions of the first part connecting portion 4a and the second part connecting portion 4b, but only in part of the width direction regions of the first part connecting portion 4a and the second part connecting portion 4b (two end regions in the width direction).

The connecting fibers 4 are embedded in the adhesive layer 9, for example, in a state in which the first part 2 and the second part 3 are bonded via the adhesive layer 9. No limitation is imposed thereby; the connecting fibers 4 can also be disposed to bypass the adhesive layer 9, in a state in which the first part 2 and the second part 3 are bonded via the adhesive layer 9.

The fibers constituting the connecting fibers 4 are not particularly limited and can be such fibers as carbon fibers and aramid fibers. In addition, for example, NCF (Non Crimp Fabric) or woven fabric (woven fiber cloth) can be used as the connecting fibers 4. As a result, by sandwiching the first part connecting portion 4a of the connecting fibers 4 between the first fiber layers 5 of the first part 2, the first part connecting portion 4a constitutes a fabric layer common with the first fiber layers 5 (that is, a part of the first fiber layers 5). On the other hand, by sandwiching the second part connecting portion 4b of the connecting fibers 4 between the second fiber layers 7 of the second part 3, the second part connecting portion 4b constitutes a fabric layer common with the second fiber layers 7 (that is, a part of the second fiber layers 7).

Next, one example of the method for producing the fiber-reinforced resin component 1 according to the present embodiment will be described.

For example, RTM (Resin Transfer Molding) molding is used as the method for producing the fiber-reinforced resin component 1.

1. Stacking

First, as illustrated in FIG. 4A, a plurality of the first fiber layers 5 are stacked, and a plurality of the second fiber layers 7 are stacked. At this time, the first part connecting portion 4a of the connecting fibers 4 are sandwiched between the first fiber layers 5, and the second part connecting portion 4b of the connecting fibers 4 are sandwiched between the second fiber layers 7. As a result, the intermediate portion 4c between the first part connecting portion 4a and the second part connecting portion 4b of the connecting fibers 4 is exposed from the first fiber layers 5 and the second fiber layers 7.

2. Impregnation of Matrix Resin

Next, as illustrated in FIG. 4B, the first fiber layers 5, the second fiber layers 7, and the connecting fibers 4 that have been stacked are placed inside a molding die 10 for molding. In addition, along with stacking a plurality of the first fiber layers 5, a plurality of the second fiber layers 7 may be stacked inside the molding die 10 as well.

Next, as illustrated in FIG. 4C, the matrix resins 6, 8 are injected into the molding die 10 from a resin injection port, which is not shown, to impregnate the first fiber layers 5 with the matrix resin (first resin) 6 as well as to impregnate the second fiber layers 7 with the matrix resin (second resin) 8. Then, in a state in which the first fiber layers 5 and the second fiber layers 7 are impregnated with the matrix resins 6, 8, the matrix resins 6, 8 are cured (solidified).

3. Measures to Suppress Impregnation of Matrix Resin

Figure 5A:
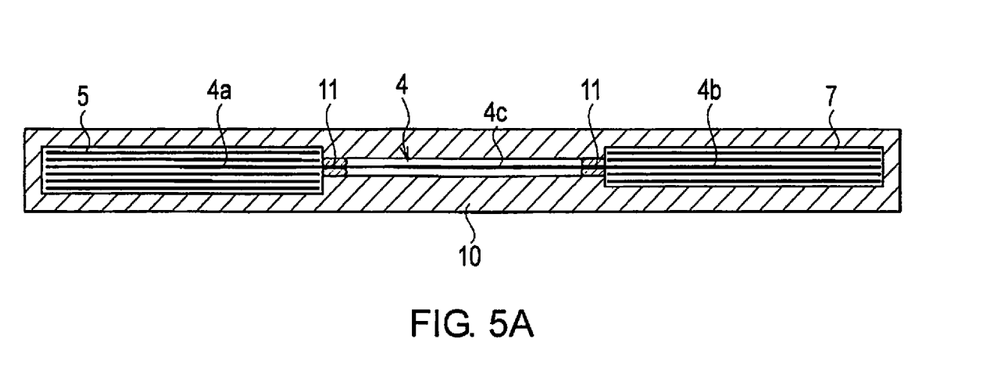
FIG. 5A is an explanatory view of a method for producing a fiber-reinforced resin component according to the embodiment of the present invention.

For example, as shown in FIG. 5A, a sealing member 11 such as packing is disposed in the intermediate portion 4c of the connecting fibers 4 such that the intermediate portion 4c of the connecting fibers 4 is not impregnated with the matrix resins 6, 8. That is, disposing the sealing member 11 inside the molding die 10 prevents the matrix resins 6, 8 from flowing into the portion of the molding die 10 in which the intermediate portion 4c of the connecting fibers 4 is disposed.

Figure 5B:
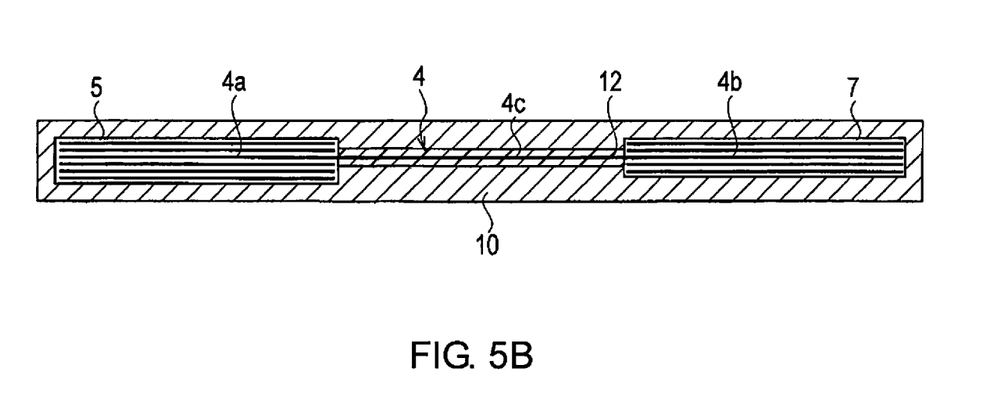
FIG. 5B is an explanatory view of the method for producing a fiber-reinforced resin component according to the embodiment of the present invention.

In addition, as illustrated in FIG. 5B, the intermediate portion 4c of the connecting fibers 4 may be covered with a brittle resin 12, such as acrylic resin, so that the intermediate portion 4c of the connecting fibers 4 is not impregnated with the matrix resins 6, 8. That is, prior covering of the intermediate portion 4c of the connecting fibers 4 with the brittle resin 12 prevents the matrix resins 6, 8 from flowing into the portion of the molding die 10 in which the intermediate portion 4c of the connecting fibers 4 is disposed. In this case, the brittle resin 12 is removed from the intermediate portion 4c of the connecting fibers 4 after the matrix resins 6, 8 are cured (after solidification).

Figure 5C:
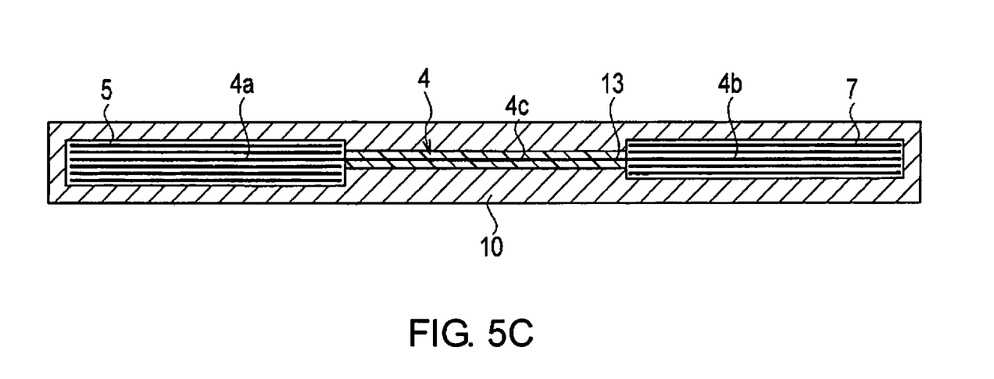
FIG. 5C is an explanatory view of the method for producing a fiber-reinforced resin component according to the embodiment of the present invention.

In addition, as illustrated in FIG. 5C, the intermediate portion 4c of the connecting fibers 4 may be covered with a soft resin 13, such as polyurethane or polyethylene, so that the intermediate portion 4c of the connecting fibers 4 is not impregnated with the matrix resins 6, 8. That is, prior covering of the intermediate portion 4c of the connecting fibers 4 with a soft resin 13 prevents the matrix resins 6, 8 from flowing into the portion of the molding die 10 in which the intermediate portion 4c of the connecting fibers 4 is disposed. In this case, since the soft resin 13 is flexible after curing, the soft resin may be left after the matrix resins 6, 8 are cured (after solidification) without being removed from the intermediate portion 4c of the connecting fibers 4.

4. After the Matrix Resin is Cured (after Solidification)

Figure 6A:
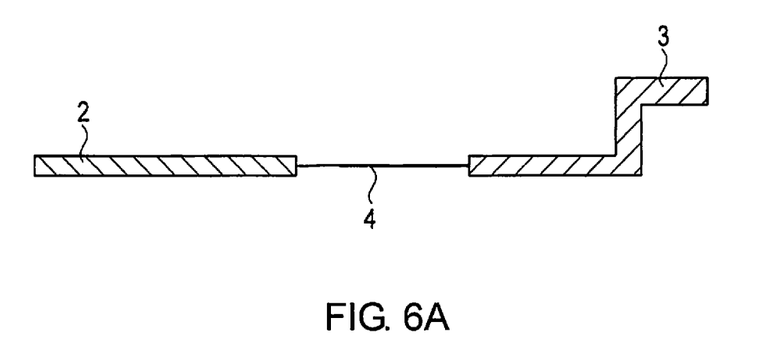
FIG. 6A is an explanatory view of the method for producing a fiber-reinforced resin component according to the embodiment of the present invention.

As shown in FIG. 6A, after the matrix resins 6, 8 are cured (after solidification), the first part 2, the second part 3, and the connecting fibers 4 are removed from the molding die 10. In a state in which the matrix resins 6, 8 are cured (after solidification), shown in FIG. 6A, the intermediate portion 4c of the connecting fibers 4 can be freely deformed.

Figure 6B:
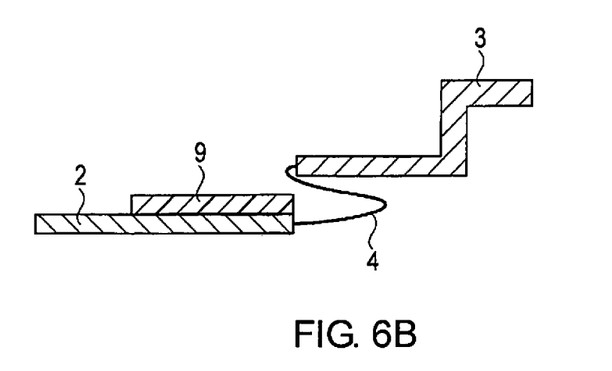
FIG. 6B is an explanatory view of the method for producing a fiber-reinforced resin component according to the embodiment of the present invention.
Figure 6C:
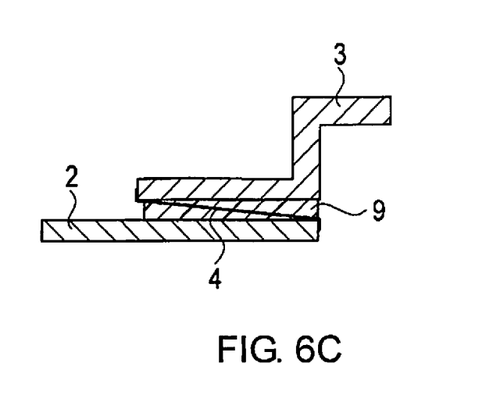
FIG. 6C is an explanatory view of the method for producing a fiber-reinforced resin component according to the embodiment of the present invention.

As shown in FIGS. 6B and 6C, the first part 2 and the second part 3 are then bonded using the adhesive, thereby forming adhesive layer 9 between the first part 2 and the second part 3. When the first part 2 and the second part 3 are bonded using the adhesive, for example, the intermediate portion 4c of the connecting fibers 4 is embedded in the adhesive layer 9. In addition, the intermediate portion 4c of the connecting fibers 4 may also be disposed to bypass the adhesive layer 9, so that the connecting fibers 4 do not interfere with the adhesion between the first part 2 and the second part 3.

The action and effect of the present embodiment will now be described.

(1) The connection structure of the fiber-reinforced resin component 1 according to the present embodiment comprises the first part 2, which has a plurality of the first fiber layers 5 and the matrix resin 6 that is impregnated in the first fiber layers 5, and the second part 3, which is bonded to the first part 2 via the adhesive layer 9. This connection structure further comprises the connecting fibers 4 that connect the first part 2 and the second part 3. The second part 3 has a plurality of the second fiber layers 7 and the matrix resin 8, which is impregnated in the second fiber layers 7. One end portion 4a of the connecting fibers 4 is sandwiched between first fiber layers 5, and the other end portion 4b of the connecting fibers 4 is sandwiched between second fiber layers 7.

In the connection structure of the fiber-reinforced resin component 1 according to the present embodiment, the first part 2 and the second part 3 are connected by the connecting fibers 4, and the intermediate portion 4c of the connecting fibers 4 is not impregnated with the matrix resins 6, 8. As a result, even if the connection between the first part 2 and the second part 3 (adhesion by means of the adhesive) is released due to an input of a relatively large load on the first part 2 or the second part 3, the connection between the first part 2 and the second part 3 (connection by the connecting fibers 4) is maintained by the connecting fibers 4. Therefore, according to the connection structure of the fiber-reinforced resin component 1 of the present embodiment, it is possible to prevent the first part 2 and the second part 3 from separating.

Since the one end portion 4a of the connecting fibers 4 is sandwiched between first fiber layers 5, and the other end portion 4b of the connecting fibers 4 is sandwiched between second fiber layers 7, it becomes possible to hold the connecting fibers 4 to the first part 2 and the second part 3 relatively firmly.

(2) One end portion 4a of the connecting fibers 4 is disposed in the intermediate layer of the first fiber layers 5, and the other end portion 4b of the connecting fibers 4 is disposed in the intermediate layer of the second fiber layers 7.

By means of disposing one end portion 4a of the connecting fibers 4 in the intermediate layer of the first fiber layers 5 and the other end portion 4b of the connecting fibers 4 in the intermediate layer of the second fiber layers 7, it becomes possible to hold the connecting fibers 4 to the first part 2 and the second part 3 more firmly.

(3) The connecting fibers 4 are embedded in the adhesive layer 9, for example.

By means of embedding the connecting fibers 4 in the adhesive layer 9, it is possible to configure the connecting fibers 4 (intermediate portion 4c) to be unexposed, in a state in which the first part 2 and the second part 3 are bonded via the adhesive layer 9.

(4) The connecting fibers 4 may be disposed to bypass the adhesive layer 9.

By means of disposing the connecting fibers 4 to bypass the adhesive layer 9, it is possible to prevent the connecting fibers 4 (intermediate portion 4c) from interfering with the adhesion between the first part 2 and the second part 3.

(5) For example, the first part 2 is an outer panel of a vehicle and the second part 3 is a bracket for attaching the outer panel to the vehicle body of the vehicle.

It is possible to prevent the outer panel and the bracket from separating, even if the connection between the outer panel and the bracket (adhesion by means of the adhesive) is released due to an input of a relatively large load on the bracket or the outer panel of the vehicle.

(6) The method for producing the fiber-reinforced resin component 1 according to the present embodiment comprises a step for exposing the intermediate portion 4c of the connecting fibers 4 by sandwiching the one end portion 4a of the connecting fibers 4 between the first fiber layers 5 and sandwiching the other end portion 4b of the connecting fibers 4 between the second fiber layers 7. This production method further comprises a step for impregnating the first fiber layers 5 and the second fiber layers 7 with the matrix resins 6, 8 without impregnating the intermediate portion 4c of the connecting fibers 4 with the matrix resins 6, 8, and a step for solidifying the matrix resins 6, 8.

By means of the configuration described above, it is possible to efficiently produce the fiber-reinforced resin component 1. In particular, since the one end portion 4a of the connecting fibers 4 is sandwiched between first fiber layers 5 and the other end portion 4b of the connecting fibers 4 is sandwiched between second fiber layers 7, it becomes possible to hold the connecting fibers 4 to the first part 2 and the second part 3 relatively firmly.

(7) For example, the sealing member 11 is disposed in the intermediate portion 4c of the connecting fibers 4 such that the intermediate portion 4c of the connecting fibers 4 is not impregnated with the matrix resins 6, 8.

By means of the configuration described above, it is possible to avoid impregnating the intermediate portion 4c of the connecting fibers 4 with the matrix resins 6, 8, while impregnating the first fiber layers 5 and the second fiber layers 7 with the matrix resins 6, 8.

(8) By means of covering the intermediate portion 4c of the connecting fibers 4 with the brittle resin 12, it is possible to avoid impregnating the intermediate portion 4c of the connecting fibers 4 with the matrix resins 6, 8.

Also, by means of the configuration described above, it is possible to avoid impregnating the intermediate portion 4c of the connecting fibers 4 with the matrix resins 6, 8, while impregnating the first fiber layers 5 and the second fiber layers 7 with the matrix resins 6, 8.

(9) By means of covering the intermediate portion 4c of the connecting fibers 4 with the soft resin 13, it is possible to avoid impregnating the intermediate portion 4c of the connecting fibers 4 with the matrix resins 6, 8.

Also by means of the configuration described above, it is possible to avoid impregnating the intermediate portion 4c of the connecting fibers 4 with the matrix resins 6, 8, while impregnating the first fiber layers 5 and the second fiber layers 7 with the matrix resins 6, 8.

The contents of the present invention have been explained above in accordance with the embodiments, but the present invention is not limited by these descriptions, and it would be obvious to a person skilled in the art that various modifications and improvements are possible.

The invention claimed is:

1. A fiber-reinforced resin component comprising:
   a first part having a plurality of first fiber layers and a first matrix resin impregnated in the first fiber layers;
   a second part having a plurality of second fiber layers and a second matrix resin impregnated in the second fiber layers;
   an adhesive layer provided between the first part and the second part such that the second part is bonded to the first part through the adhesive layer; and
   a plurality of connecting fibers connecting the first part and the second part,
   one end portion of the connecting fibers being sandwiched between the first fiber layers, and an opposite end portion of the connecting fibers being sandwiched between the second fiber layers, and
   the connecting fibers including an intermediate portion that is not impregnated with a resin.

2. The fiber-reinforced resin component according to claim 1, wherein
   the one end portion of the connecting fibers is disposed in an intermediate layer of the first fiber layers, and the other end portion of the connecting fibers is disposed in an intermediate layer of the second fiber layers.

3. The fiber-reinforced resin component according to claim 1, wherein
   the connecting fibers are embedded in the adhesive layer.

4. The fiber-reinforced resin component according to claim 1, wherein
   the connecting fibers are disposed to bypass the adhesive layer.

5. The fiber-reinforced resin component according to claim 1, wherein
   the first part is an outer panel of a vehicle and the second part is a bracket for attaching the outer panel to a vehicle body of the vehicle.

* * * * *